(12) United States Patent  (10) Patent No.: US 6,427,502 B1
Zagoroff  (45) Date of Patent: Aug. 6, 2002

(54) TRUCK TAILGATE LOCKING DEVICE

(75) Inventor: Dimiter S. Zagoroff, Lincoln, MA (US)

(73) Assignee: Steadfast Corporation, Chelsea, MA (US)

( * ) Notice: Subject to any disclaimer, the term of this patent is extended or adjusted under 35 U.S.C. 154(b) by 0 days.

(21) Appl. No.: 09/429,970

(22) Filed: Oct. 29, 1999

(51) Int. Cl.⁷ .............................................. B60R 25/02
(52) U.S. Cl. .............. 70/208; 292/336.3; 292/DIG. 29; 292/DIG. 31; 292/DIG. 43
(58) Field of Search ............ 70/208, 209; 292/DIG. 29, 292/31, 42, 43, 336.3; 296/50, 57.1; 411/910, 911

(56) References Cited

U.S. PATENT DOCUMENTS

| | | | |
|---|---|---|---|
| 1,842,741 A | * | 1/1932 | Bengtsson ............... 411/911 X |
| 3,126,219 A | * | 3/1964 | Engesser et al. ........ 411/911 X |
| 4,850,209 A | | 7/1989 | Weinerman et al. .......... 70/208 |
| 4,911,487 A | | 3/1990 | Rachocki ................ 70/208 X |
| 4,951,486 A | | 8/1990 | Braun et al. .................. 70/208 |
| 5,004,287 A | | 4/1991 | Doyle ............. 292/DIG. 43 X |
| 5,104,171 A | | 4/1992 | Johnsen et al. ................ 296/50 |
| 5,172,946 A | | 12/1992 | Dowling ..................... 292/216 |
| 5,265,450 A | | 11/1993 | Doyle ............. 292/DIG. 29 X |
| 5,297,405 A | * | 3/1994 | Manning et al. .............. 70/208 |
| 5,303,971 A | | 4/1994 | Johnsen et al. ........... 70/208 X |
| 5,340,174 A | | 8/1994 | Bender et al. ........... 292/336.3 |
| 5,439,260 A | | 8/1995 | Weinerman et al. ...... 70/208 X |
| 5,595,076 A | | 1/1997 | Weinerman et al. .......... 70/208 |
| 5,713,705 A | * | 2/1998 | Grunbichler ............ 411/910 X |
| 5,941,104 A | * | 8/1999 | Sadler ........................ 70/208 |
| 5,987,943 A | * | 11/1999 | Verga et al. .................. 70/208 |

* cited by examiner

*Primary Examiner*—Suzanne Dino Barrett
(74) *Attorney, Agent, or Firm*—Hamilton, Brook, Smith & Reynolds, P.C.

(57) ABSTRACT

A tailgate locking device includes a cylinder lock supported by a bracket which fits into the recess present in the standard insert or bezel which surrounds the latch handle in a truck tailgate. The bracket is secured to the tailgate in such a way that it cannot be removed from the tailgate either from the inside or outside thereof. When the lock is rotated to a locked position, it moves a locking arm into position in front of the latch handle thereby preventing actuation of the latch to open the tailgate. Rotation of the lock to its unlocked position frees the latch handle allowing the tailgate to be opened.

9 Claims, 4 Drawing Sheets

TRUCK TAILGATE LOCKING DEVICE

BACKGROUND OF THE INVENTION

1. Field of the Invention

This invention relates to anti-theft truck tailgate devices and more specifically to the secure mounting of a lock to prevent actuating the tailgate handle to open the tailgate.

A pickup truck typically has a cargo space secured by a tailgate. Pulling up on the tailgate handle releases a latching mechanism so that the tailgate may be swung down around its hinges to a horizontal position to provide access to the cargo area for loading and unloading. Generally, the hinges are constructed to permit lifting the tailgate off its hinges when it is in the horizontal position and removing it from the truck.

The need to lock the tailgate is twofold. First, particularly when a camper top or a tonneau cover is mounted on the truck, it is desirable to be able to lock the tailgate to protect the gear stowed inside. Secondly, the tailgate itself is a desirable object for theft.

A tailgate is generally constructed as a box section with the inner panel and the outer panel spaced apart by several inches. The handle and the latching mechanism is mounted between the two panels. To install the latching mechanism, truck manufacturers have taken two different approaches. One approach is to insert the mechanism from the inside, by providing a removable access door on the inside panel. The other, less expensive approach is to insert the mechanism from the outside through a handle aperture in the outside panel. In that instance, the handle aperture must be made big enough to accommodate the latching mechanism. To improve the appearance of the tailgate exterior, a snap-in plastic bezel may be mounted to the tailgate outer panel filling the void between the handle and the edges of a aperture.

2. Description of the Prior Art

One anti-theft device, described in the above pending application, comprises a replacement bezel supporting a lock with a locking arm that prevents actuation of the tailgate handle and with a locking bolt that prevents removal of the bezel when the device is in the locked position. While this device affords a convenient and secure anti-theft solution, it is relatively expensive to manufacture. The replacement bezel has an intricate shape with retaining clips that has to be molded by precision injection molding tools. The truck manufacture can amortize the cost of these tools over the whole number of trucks that are manufactured. However, the after-market manufacturer of the replacement bezel has to amortize the same tooling cost over a much smaller number of units sold which adds significantly to the cost of those units. In addition, the cost of the that prior anti-theft device is raised further by the need for both a locking arm and a locking bolt.

SUMMARY OF THE INVENTION

It is therefore one object of my invention to eliminate the above disadvantages and provide a tailgate anti-theft locking device which is convenient and secure, but also inexpensive to manufacture.

Another object of the invention is to provide a device of this type which can be retrofit to a variety of different truck models.

A further object of my invention is to provide a tailgate anti-theft locking device that can be installed easily by the truck owner.

Further objects and advantages will become apparent from a consideration of the ensuing description and the accompanying drawings.

Briefly, my tailgate locking device comprises a cylinder lock supported by a bracket which fits into the recess present in the standard insert or bezel which surrounds the latch handle in a truck tailgate. The bracket is secured to the tailgate in such a way that it cannot be removed from the tailgate either from the inside or outside thereof. When the lock is rotated to a locked position, it moves a locking arm into position in front of the latch handle thereby preventing actuation of the latch to open the tailgate. Rotation of the lock to its unlocked position frees the latch handle allowing the tailgate to be opened. In one preferred embodiment of the invention, the means for securing the anti-theft device to the tailgate cannot even be accessed so long as the device is in its locked position.

DETAILED DESCRIPTION OF AN ILLUSTRATIVE EMBODIMENT

Figure 1:
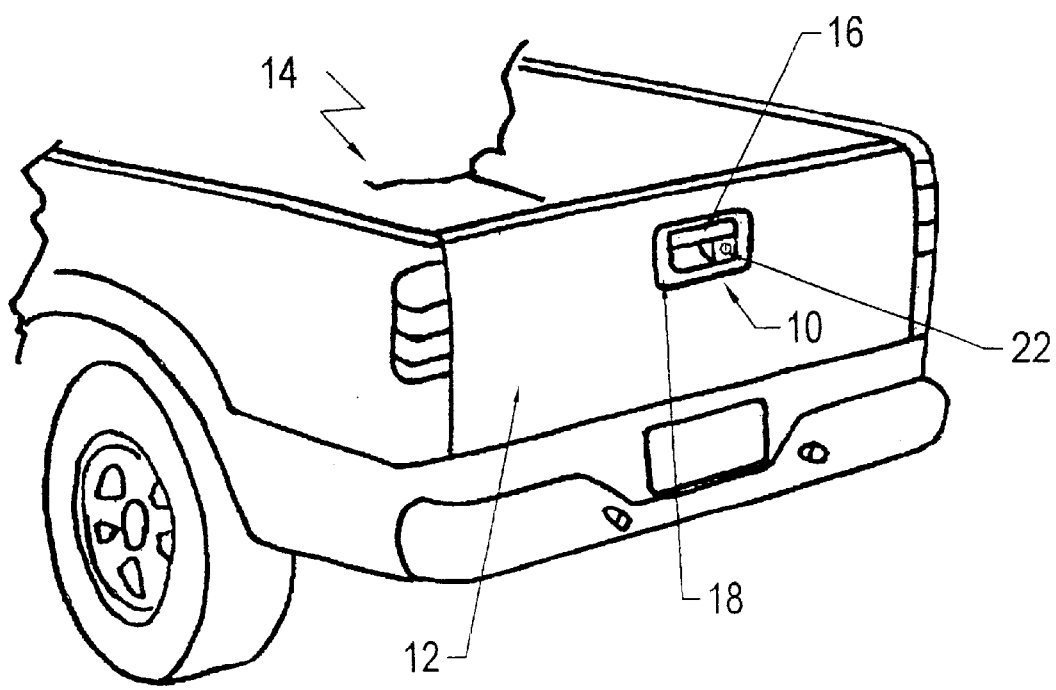
FIG. 1 is a perspective view of the tailgate of a pickup truck and incorporating a tailgate locking device according to the invention.

Referring to FIG. 1 of the drawings, an anti-theft locking device shown generally at 10 is shown installed in the swing-down tailgate 12 of a standard pick-up truck 14, e.g., a 1999 Chevrolet pickup. Tailgate 12 is normally maintained in an upright latched position by a latching mechanism 17 (FIG. 4) installed in the tailgate. However, when a tailgate handle 16, which is part of the latching mechanism, is pulled up, the latching mechanism releases the tailgate 12 so that the tailgate may be swung down to an open position.

Figure 2A:
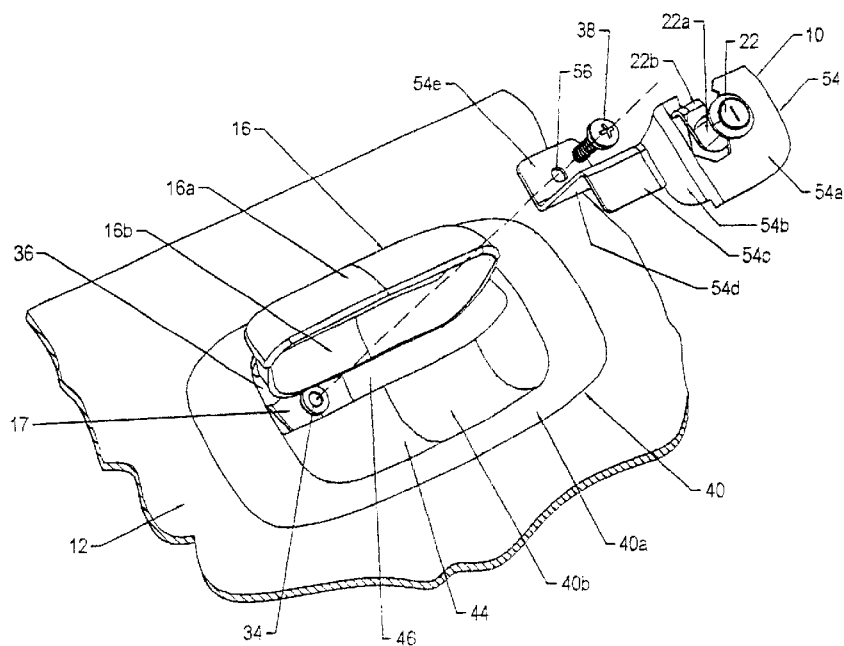
FIG. 2a is an exploded perspective view on a much larger scale of the FIG. 1 tailgate showing the tailgate handle in its raised unlatching position and the locking device components prior to installation.

As will be described in more detail later, the locking device 10 includes a lock 22 supported by bracket 54 (FIG. 2a). The lock is movable between a locked position which prevents the tailgate handle from being raised in order to unlatch the tailgate and an unlocked position which releases the tailgate handle allowing the tailgate to be unlatched and swung open.

Figure 4:
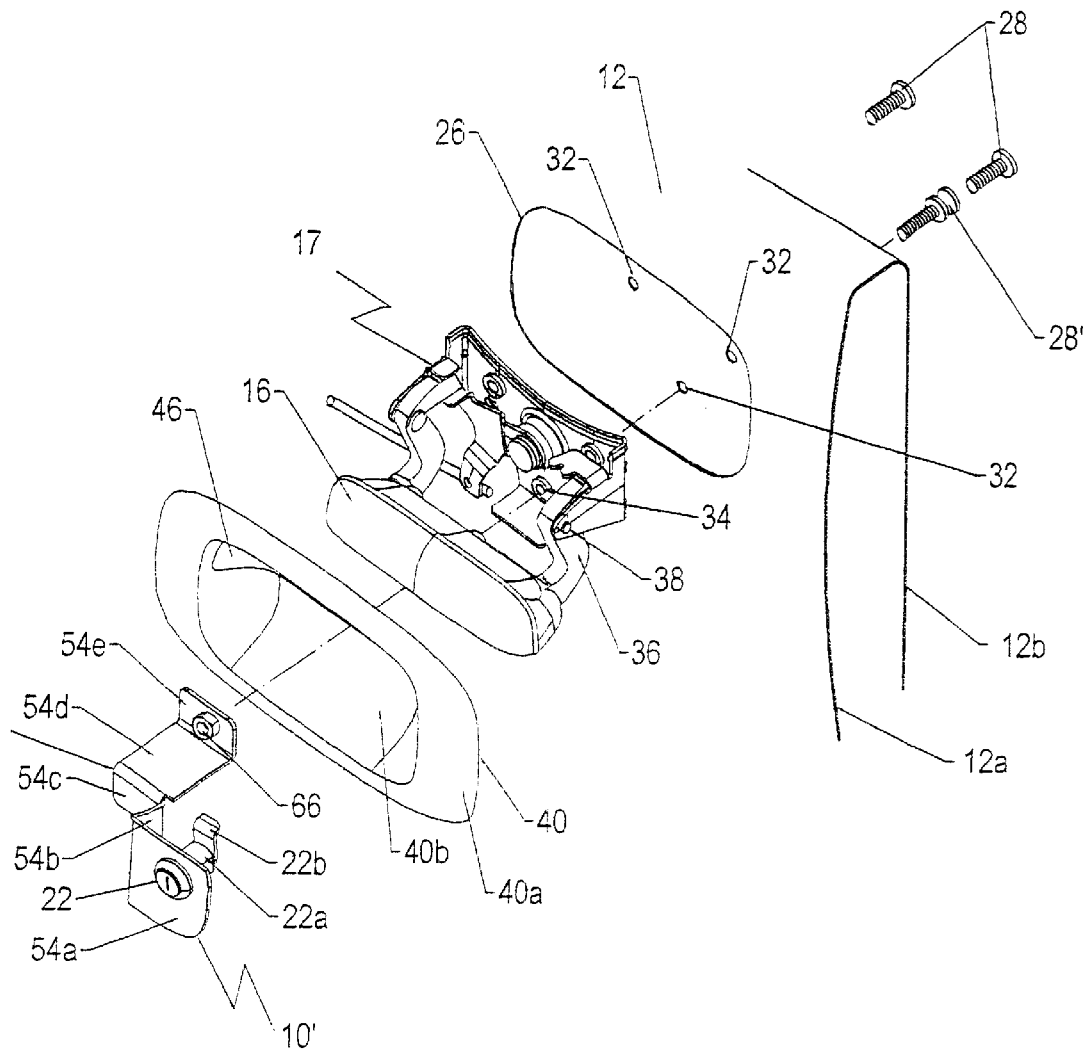
FIG. 4 is an exploded isometric view of a second embodiment of my locking device.

The tailgate 12 and latching mechanism 17 therefor are well known and do not constitute part of my invention. Rather, they are installed on truck 14 at the factory. Suffice it to say that, as shown in FIG. 4, the tailgate 12 comprises an outer panel 12a and an inner panel 12b, there being a space between the two panels. Panel 12a is provided with a relatively large aperture 26 to provide clearance for insertion of the latching mechanism 17 into the tailgate through the aperture so that the mechanism can be seated against inner panel 12b. Normally, the mechanism 17 includes a base 17a anchored to panel 12b by a plurality of threaded fasteners 28 which are inserted through holes 32 in panel 12b and turned down into threaded holes 34 in the base 17a of latching mechanism 17.

Figure 3A:
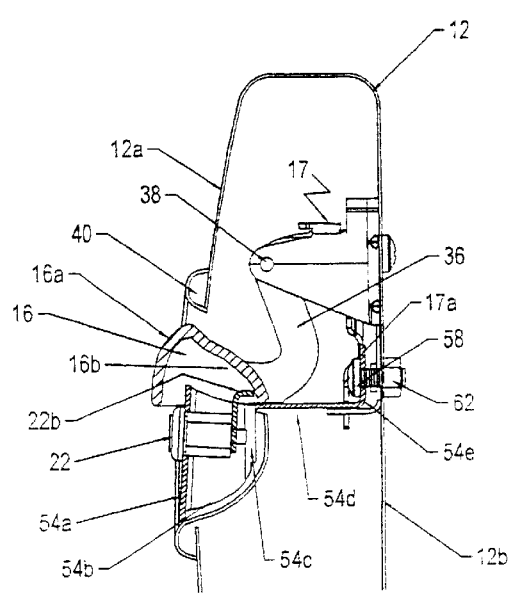
FIGS. 3a and 3b are sectional view taken along line 3—3 of FIG. 2B showing the locking device in its locked and unlocked positions, respectively.
Figure 3B:
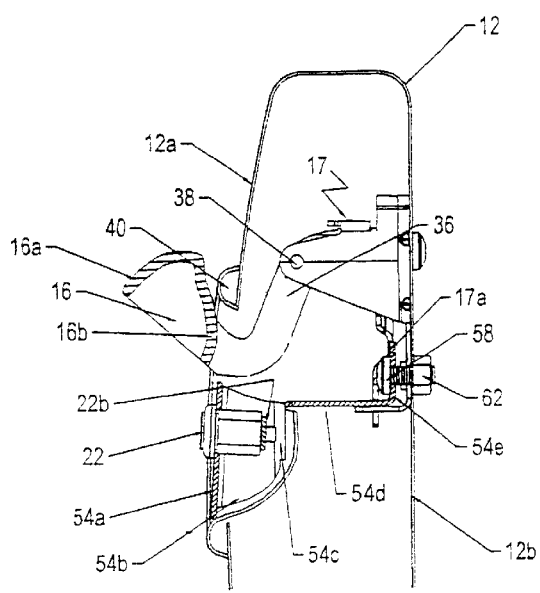

As shown in FIGS. 3a, 3b and 4, handle 16 is a shell-like part having a front wall 16a and a rear wall 16b. A pair of laterally spaced-apart arms 36 extends from the rear wall 16b, which arms are connected by a pair of pivots 38 to the base 17a of latching mechanism 17 per se so that the handle can be swung between the positions shown in FIGS. 3a and 3b in order to latch and unlatch tailgate 12.

Figure 2B:
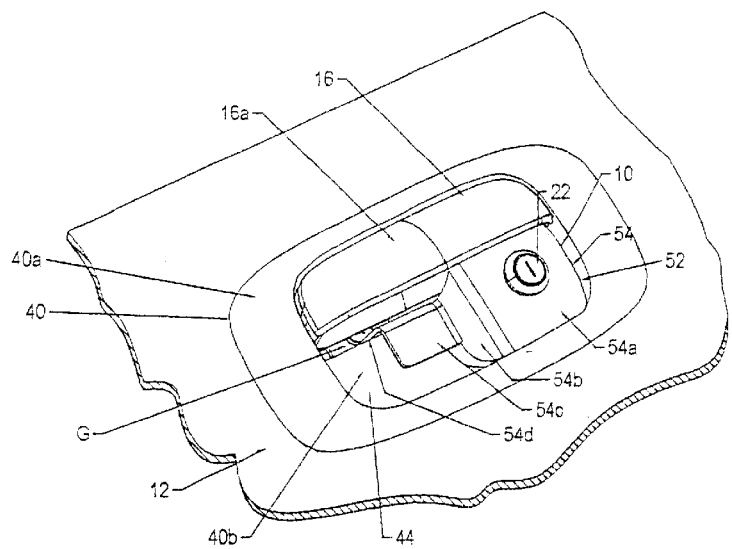
FIG. 2b is a perspective view of the tailgate showing the locking device fully installed and with the tailgate handle in its lower latching position.

When tailgate 12 is installed on truck 14 at the factory, it is normally provided with a bezel to cover the space between the latching mechanism 17 and the edge of the aperture 26 in the tailgate. As best seen in FIGS. 2a and 3a, bezel 40 comprises a frame portion 40a which surrounds a central recess 40b. The lower half of recess 40b defines a pocket 44. A through-hole 46 is provided in the upper half of that recess to provide clearance for the tailgate handle 16 and its arms 36 so that the handle may be moved between its unlatching and latching positions shown in FIGS. 3a and 3b, respectively. As shown in FIGS. 2b and 3a, when the handle is in its latching position, the handle front wall 16a is more or less flush with the face of the frame portion 40a of bezel 40. On the other hand, the handle rear wall 16b substantially fills the through-hole 46 in the bezel. Note from FIG. 2b, however, that a narrow gap G exists between the edge of the handle rear wall 16a and the rear edge of pocket 44. Note also that when handle 16 is in its raised unlatching position shown in FIG. 2a, the left hand threaded hole 34 in the base 17a of the latching mechanism 17 is exposed in the bezel via through-hole 46.

As best seen in FIG. 2a the bracket 50 comprises a stamped metal piece which is formed with a succession of steps that define five panels or flanges. More particularly, there is a relatively large outer panel 54a to which the lock 22 is mounted. A second panel 54b of the bracket extends at right angles to panel 54a and leads to a third smaller panel 54c which is more or less parallel to panel 54a. A fourth bracket panel 54d extending at right angles to both panels 54b and 54c leads to a fifth or inner panel 54e which is parallel to panels 54a and 54c. A screw hole 56 is provided in panel 54e.

Bracket 54 is designed and dimensioned so that it can be positioned in the bezel recess 40b with bracket panel 54c seating against the bottom of pocket 44 and the bracket panel 54d extending through the gap G so that panel 54e engages the latching mechanism base 17a with hole 56 in alignment with the left-hand threaded hole 34 in the base 17a. The bracket 54 is secured to latching mechanism base 17a and the rear panel 12b of the tailgate by a threaded fastener 58 (FIG. 2a) which extends through the bracket hole 56 and is turned down into the lower threaded hole 34 in the base 17a. That is, the original equipment fastener 28 shown in FIG. 4 that was installed from inside the tailgate at that location is removed and replaced by fastener 58 installed from outside the tailgate via through-hole 46. In order to preserve the multiple connections between the latching mechanism and the tailgate panel 12b, a nut 62 may be turned down onto the inner end of fastener 58 behind that panel as shown in FIGS. 3a and 3b.

As best seen in FIG. 2b, when locking insert 52 is properly installed, the bracket panels 54a and 54b form the two sides of a box that fits closely in the right side corner of the bezel pocket 44 so that the keyhole end of lock 22 is accessible directly under handle 16. The lock barrel 22a extends down into pocket 44 behind the bracket panel 54a and contains a lock cylinder which controls the angular position of an L-shaped stop member or arm 22b (FIG. 2a) at the inner end of the barrel. When tailgate 12 is latched and lock 22 is in its locked position shown in FIG. 3a, the arm 22b extends up in front of the rear wall 16b of handle 16 thereby preventing the handle from being pulled up to its unlatching position shown in FIG. 3b. Thus, so long as lock 22 is in its locked position, the tailgate cannot be unlatched and opened. Also, it should be noted that when tailgate 12 is latched and locked by lock 22, the handle 16 substantially fills the through-hole 46 in bezel 40 and thus completely covers the head of fastener 58. Therefore, the locking insert 52 and bezel 40 cannot be removed from the tailgate 12.

By inserting the proper key into lock 22, the lock cylinder may be rotated one quarter turn so that the lock arm or stop 22b is rotated away from handle 16 to the position shown in FIG. 3b. This allows the handle to be raised up to unlatch the tailgate as shown in that figure.

The bracket 54 of locking device 10 is specifically designed to be anchored to tailgate 12 from the outside, access to the screw-hole 34 being had via through-hole 46 when the tailgate handle 16 is raised as shown in FIG. 2a. FIG. 4 shows a slightly different locking device embodiment 10' which is secured to tailgate 12 from the inside. This locking device embodiment employs a slightly different bracket 54'. More particularly, the inner panel 54e of bracket 54 has a threaded nut 66 welded or otherwise anchored to that panel over the hole 56 therein. In this embodiment, the fastener 28 that normally secures the latching mechanism 17 to the tailgate panel 12b is replaced with a slightly smaller diameter fastener 28' which can be inserted through the lower hole 32 in the tailgate panel 12b and through the lower threaded hole 34 in the latching mechanism and turned down into the nut 66 on the bracket 54'. Thus, both modes of securement described herein re-establish the holding power provided by the factory installed fasteners 28.

If desired, an additional measure of security may be provided by using for the fastener 28, 28' and/or 58 known one-way fasteners which have a head that is slotted so that the fastener can only be turned in the screwing or tightening direction. Alternatively, known safety fasteners may be employed which have a head that breaks off when the fastener is tightened. In both cases, the fasteners cannot be removed except by drilling them out.

It will be seen from the foregoing that my locking device can be retrofit to a variety of different vehicles so that the tailgates of those vehicles cannot be opened or removed without access to the key for the locking device 10. This should greatly reduce the incidence of tailgate theft and prevent the tailgate from being opened when the vehicle is being used as a camper or the like.

The main component of the locking device 10, namely the bracket 54 is a simple stamped metal part which can be fabricated in quantity relatively inexpensively. On the other hand, the lock 22 component of device 10 is an off-the-shelf item which can be purchased in quantity at low cost and assembled easily to the bracket. The locking device can be sold in kit form as an after-market item and be installed easily by the truck owner. Therefore, the locking device should prove to be a very marketable product.

It will thus be seen that the objects set forth, among those made apparent from the preceding description, are efficiently attained. Also, certain changes may be made in the above constructions without departing from the scope of the invention. Therefore, it is intended that all matter contained in the above description are shown in the accompanying drawings shall be interpreted as illustrative and not in a limiting sense.

It is also to be understood that the following claims are intended to cover all of the generic and specific features of the invention described therein.

What is claimed is:

1. A tailgate security device for a tailgate having an outer panel and an inner panel, said outer panel facing outwardly from the vehicle in which the tailgate is mounted, an aperture in the outer panel, a bezel positioned in the aperture, the bezel having a recess and a through-hole extending above the recess, a latch mechanism in the tailgate said mechanism including a base, a lever arm pivotally connected to the base and extending through said aperture to a handle positioned in said recess whereby when the handle is rotated outward, the latch mechanism unlatches the tailgate, the security device comprising:

a lock rotable between a locked position and an unlocked position and having a locking arm;

a rigid bracket having a first portion supporting the lock, a second portion which extends through the through-hole of the bezel substantially to said base and a third portion which mounts to the base; and a fastener securing said third portion to said base, when said lock is in said locked position, said arm preventing said handle from being rotated outward and when the lock is in said unlocked position, the arm being positioned to permit the handle to be rotated outward.

2. The security device defined in claim 1 wherein the lock is a cylinder lock.

3. The security device defined in claim 1 wherein said fastening means include a first threaded fastener extending through said bracket third portion and threaded into said base, and further including second fastener means securing said base to said inner panel.

4. The security device defined in claim 2 wherein said first threaded fastener extends through said base and said inner panel, and further including a nut threaded onto said first fastener behind said inner panel.

5. The security device defined in claim 4 wherein the second fastener means include a security fastener.

6. The security device defined in claim 1 wherein said fastener means include a security fastener extending through said inner panel and said base and being threaded into said bracket third portion, and further including one or more additional fasteners connecting said base to said inner panel.

7. The security device defined in claim 5 or 6 wherein said security fastener is a one-way threaded fastener.

8. The security device defined in claim 5 or 6 wherein said security fastener has a head which breaks away when sufficient torque is exerted on the head.

9. A tailgate security device for a tailgate having an outer panel and an inner panel, said outer panel facing outwardly from the vehicle in which the tailgate is mounted, an aperture in the outer panel, a bezel positioned in the aperture, the bezel having a recess and a through-hole extending above the recess, a latch mechanism in the tailgate said mechanism including a base, a lever arm pivotally connected to the base and extending through said aperture to a handle positioned in said recess whereby when the handle is rotated outward, the latch mechanism unlatches the tailgate, the security device comprising:

lock means, having a locking arm for rotating between a locked position and an unlocked position;

rigid bracket means for supporting a lock, said bracket means extending through the through-hole of the bezel substantially to said base and including means for mounting to said base;

fastener means for securing said bracket means to said base, when said lock means is in said locked position, said arm preventing said handle from being rotated outward and when the lock is in said unlocked position, the arm being positioned to permit the handle to be rotated outward.

* * * * *

UNITED STATES PATENT AND TRADEMARK OFFICE
CERTIFICATE OF CORRECTION

PATENT NO.     : 6,427,502 B1
DATED          : August 6, 2002
INVENTOR(S)    : Dimiter S. Zagoroff It is certified that error appears in the above-identified patent and that said Letters Patent is hereby corrected as shown below:

<u>Title page,</u>
Please insert the following: -- [63] Related U.S. Application Data
Continuation-in-Part of application No. 09/213,645, filed on December 17, 1998, now Pat. No. 6,209,366, which claims the benefit of Provisional application No. 60/069,930, filed on December 17, 1997. The contents of the above applications are incorporated herein by reference in their entirety. --

<u>Column 5,</u>
Line 16, delete "rotable" and insert -- rotatable --.

Signed and Sealed this

Thirty-first Day of December, 2002

JAMES E. ROGAN
*Director of the United States Patent and Trademark Office*